UNITED STATES PATENT OFFICE.

JOHANNES SCHLUTIUS, OF KAROW, GERMANY.

PROCESS OF MAKING NITRATED SUPERPHOSPHATE.

No. 872,757.

Specification of Letters Patent.

Patented Dec. 3, 1907.

Application filed January 3, 1906. Serial No. 294,348.

*To all whom it may concern:*

Be it known that I, JOHANNES SCHLUTIUS, landed proprietor, citizen of the German Empire, residing at Karow, Mecklenburg, Germany, have invented certain new and useful Improvements in Nitrated Superphosphate and Processes of Making Same; and I do hereby declare the following to be a full, clear, and exact description of the invention, such as will enable others skilled in the art to which it appertains to make and use the same The subject of my invention is a process of manufacturing a material rich in nitrogen and phosphorus and the application of the same for fertilizing purposes.

Hitherto phosphates as they occur in nature have generally been rendered soluble by treatment with sulfuric acid, whereby they are converted into soluble monocalcium phosphate and gypsum, an old process, first described by Liebig. The procedure underlying this treatment varies, depending upon the chemical composition of the particular phosphate; it may, however, in general be expressed by the equation

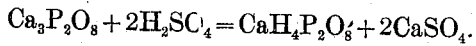

This method of effecting solubility, however, can not be regarded as a rational one, either from a chemical or economical standpoint. Chemically regarded it is not a perfect one, since the native phosphates (the phosphorites) always possess a certain percentage of iron and alumina, which bind part of the sulfuric acid forming acid reacting sulfates which are highly objectionable in the soil. When phosphates rendered soluble by the said treatment are kept for long, or even in the soil, a certain reversion of the phosphoric acid takes place, which must either be tolerated, or must be obviated during the solvent treatment by the use of excess of sulfuric acid. The reversion of the phosphoric acid involves loss of available phosphoric acid, or at any rate it retards the fertilizing action, while excess of sulfuric acid incurs unnecessary expense and numerous other disadvantages. Economically viewed, the said process is still more irrational. The reversion of the phosphoric acid, or excess of sulfuric acid, is in itself an economical drawback, but this nevertheless may be regarded as comparatively slight compared with the great economical drawback that gypsum is formed as a comparatively worthless by-product. The subject of my invention is a process whereby these serious losses are avoided. The principle of the same is, that the lime separated from its compound with phosphoric acid by the solvent treatment, is combined with another material possessing fertilizing properties, in such manner that this compound likewise becomes a food-carrier for the plants. This can be done with particular advantage by binding with nitric acid and other exidation products of nitrogen. In rendering soluble by means of nitric acid, nitrate of lime is formed instead of gypsum; and at the same time the iron and alumina contained in the phosphorites are combined with nitric acid and thus converted into carriers of nitrogen, that is to to say, into plant-foods.

Taking nitric acid as exemplificatory of the behavior of the oxidation products of nitrogen, the chemical changes underlying the process may be expressed by the following equation:

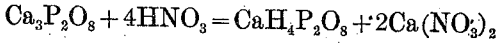

The advantage of this manner of rendering soluble is, that all the bases contained in the phosphorites, whether bases of calcium, iron, aluminium or other element, are combined with acids which are carriers of the important plant-foods phosphorus and nitrogen. There are no waste by-products formed at all. A reversion of the phosphoric acid does not take place. No gypsum whatever is formed, as is obvious; nor any other insoluble or by-products, or such as can not be utilized in the soil, or only indirectly so.

The process is especially advantageous in view of the fact that nitric acid and other oxidation products of nitrogen necessary for the solvent treatment have, of late, been obtained more cheaply than hitherto from saltpeter, by oxidation of the nitrogen of the air. This use of products of oxidation, is, as it were, to convert atmospheric nitrogen into a manure rich in nitrogen and phosphorus.

The treatment with nitric acid and other products of the oxidation of nitrogen is particularly advantageous in the case of those phosphorites which on account of their high percentage of iron and alumina, have been regarded as of little or no value; for according to the new process the iron and alumina constituents are also converted into useful carriers of nitrogen.

Having thus described my invention, what I claim as new and desire to secure by Letters Patent is,

1. The process of preparing a fertilizer which consists in oxidizing atmospheric nitrogen to form nitric acid and other products of oxidation and reacting upon a native phosphate containing iron and alumina with sufficient of such products to decompose the contained tricalcium phosphate and to combine with basic bodies present.

2. The process of preparing a fertilizer which consists in oxidizing atmospheric nitrogen and reacting upon a native phosphate containing iron and alumina with the crude products of such oxidation in sufficient quantity to decompose contained phosphates and to combine with basic bodies present.

In testimony whereof I hereunto affix my signature in the presence of two witnesses.

JOHANNES SCHLUTIUS.

Witnesses:
 HENRY HASPER,
 WOLDEMAR HAUPT.